INVENTORS
STEPHEN A. HORNUNG
CARL F. CLARK
BY
Hopgood & Calimafde
ATTORNEYS

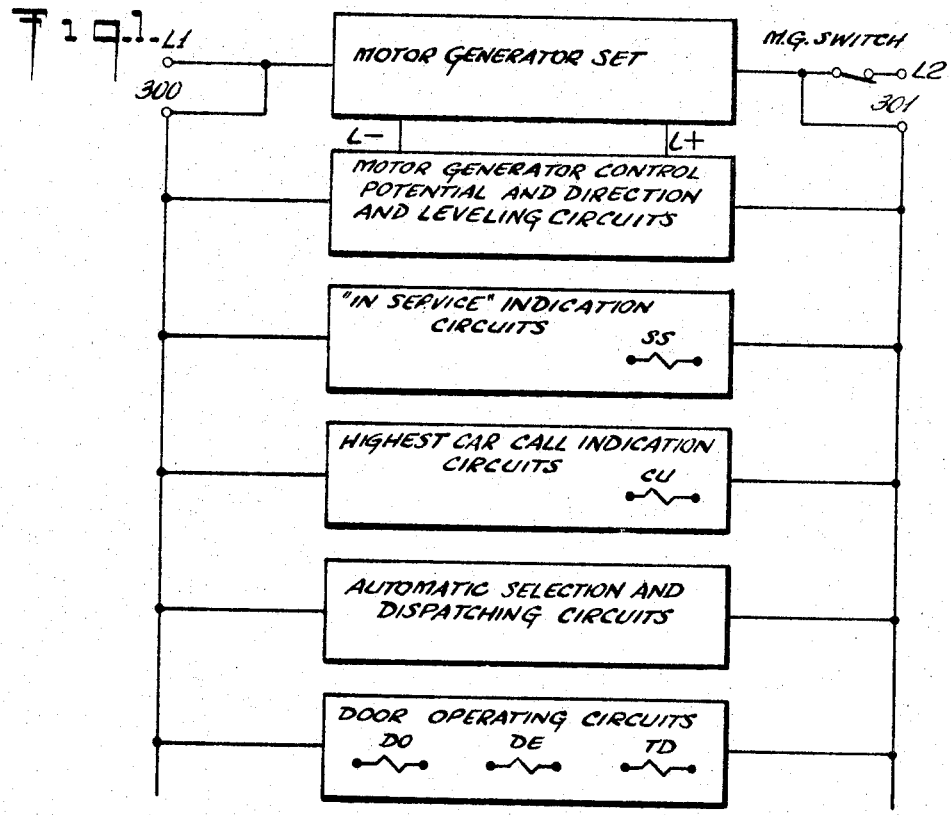
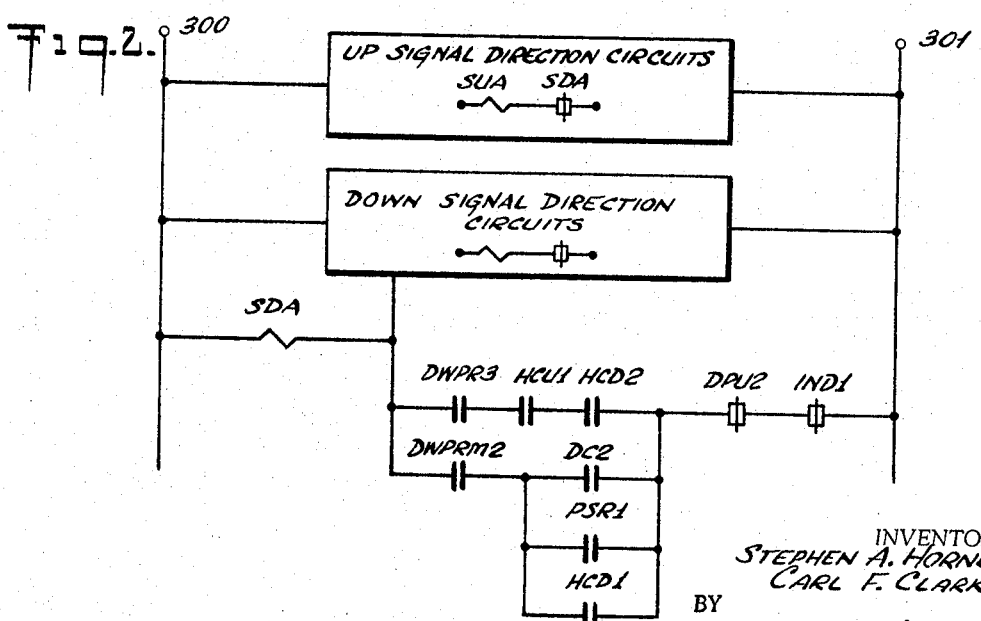

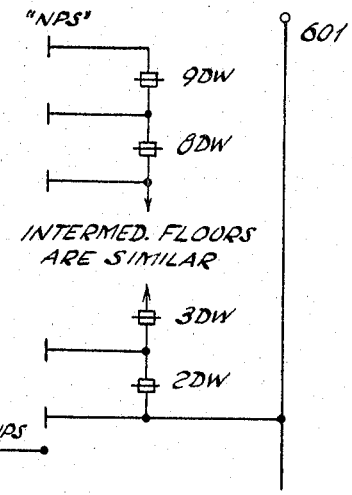
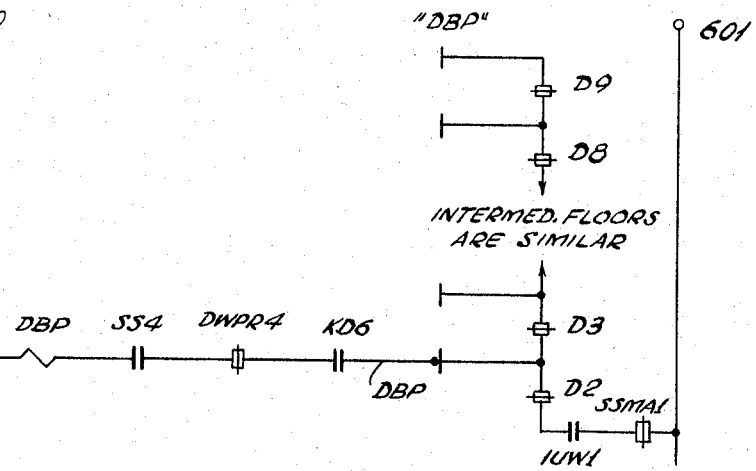
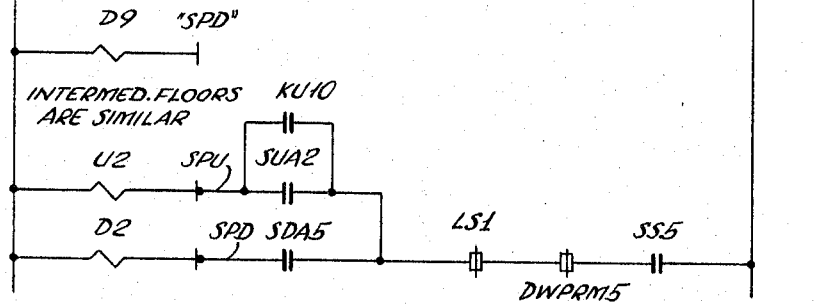

INVENTORS
STEPHEN A. HORNUNG
CARL F. CLARK
BY
Hopgood & Calimafde
ATTORNEYS

United States Patent Office 3,382,951
Patented May 14, 1968

3,382,951
ELEVATOR CONTROL IN WHICH THE PREFERRED SERVICE TIME INTERVAL IS VARIABLE
Stephen A. Hornung and Carl F. Clark, Louisville, Ky., assignors to K. M. White Company, Inc., Louisville, Ky., a corporation of Kentucky
Filed Feb. 12, 1964, Ser. No. 344,295
11 Claims. (Cl. 187—29)

ABSTRACT OF THE DISCLOSURE

An elevator control system in which hall calls achieve a preferred status over a variable period of time, and in which the movement of the cars is influenced by the presence and position of such preferred calls.

Variable time delay relays, initiated simultaneously with each hall call, establish its preferred status. As each such relay trips, establishing a preferred call, the voltage across its companion relays is reduced; thereby increasing their time to actuation. As each preferred call is answered the voltage across such relays is increased, thereby reducing their time to actuation and shortening the interval to preferred status.

Interlocking control circuitry responding to preferred calls, can reverse one or more up-traveling cars, and by-pass non-preferred down calls to service preferred down calls. However, an existing preferred up-call can prevent such a reversal.

---

This invention relates generally to elevator control systems and more particularly to preferred service elevator control systems.

A preferred service system is one in which certain elevator service calls are given preference over other service calls. For example, in one prior art preferred service system, "down" hall calls are given preference if they are not answered within a predetermined time interval. In this system, the "down" call relay for each floor activates a timer which in turn activates a "preferred service" relay if the "down" call is not answered within a predetermined time interval. When a "preferred service" relay is activated, the next car dispatched downward from the top floor will be conditioned for preferred service, i.e. it will be conditioned to by-pass ordinary "down" hall calls and to stop only for preferred service down hall calls. If there are no cars at the top floor when the preferred service relay is activated, the highest up-traveling car will be conditioned for preferred service, and if all of the cars are traveling downward, the highest down-traveling car will be conditioned for preferred service.

One specific example of a prior art preferred service system of the above-described type can be found in U.S. Patent No. 2,854,096, which was issued to K. M. White et al. on Sept. 18, 1957 for an "Elevator Dispatching and Control System." FIGS. 2 and 3 of the White patent disclose the preferred service circuits, whose operation is described in the paragraphs headed hall registering and pick-up circuits and preferred service operation. This preferred service system includes the "down" call preference system described above and also an "up" call preference system in which "up" calls from the basement and second floor are given preference over other calls.

This invention is an improvement in preferred service systems of the above described type. More specifically, this invention provides novel means for varying the time interval of the preferred service timers in accordance with traffic conditions so that during periods of light traffic a call can become a preferred service call in less time than during periods of heavy traffic. In addition, this invention provides improved preferred service elevator selection means which significantly shortens the time required to respond to preferred service calls. These and other novel features of the invention will be apparent to those skilled in the art from the following description of one specific embodiment thereof, as illustrated in the attached drawings, in which:

FIG. 1 is a block diagram of a prior art elevator dispatching and control system;

FIG. 2 is a schematic diagram of one exemplary circuit for reversing the direction of an up-traveling elevator car which has been selected for down preferred service operation;

FIG. 8 is a schematic diagram of one exemplary circuit for determining when all preferred service calls have been answered;

FIG. 9 is a schematic diagram of one exemplary circuit for by-passing down hall calls in response to an up preferred service call;

FIG. 10 is a schematic diagram of one exemplary circuit for determining the location of up and down traveling elevator cars;

Figure 3:
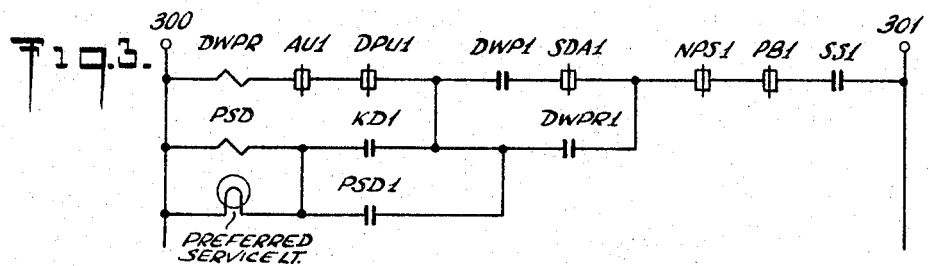
FIG. 3 is a schematic diagram of one exemplary circuit for selecting an up-traveling elevator car for down preferred service operation.

This particular embodiment of the invention is adapted to control four elevator cars operating in a bank between eleven floors (basement and 1 through 10). The first floor is designated as the lower dispatching floor, from which cars are dispatched in the up direction, and the tenth floor is designated as the upper dispatching floor, from which cars are dispatched in the down direction. However, it will be clear to those skilled in the art that the invention is equally applicable to elevator installations having different numbers of floors, different numbers of cars, and different floors designated as dispatching floors.

The following functional designations are applied to the relays and power supply buses shown in the drawings:

Power display bus designations

L1, L2—Individual elevator incoming power bus.
L10C, L20C—Individual elevator lighting supply bus.
L+, L——Individual elevator exciter voltage bus.
300, 301—Individual elevator signal supply bus.
600, 601—Common signal supply bus.

Relay designations

AU—Attendant up direction
CU—Car call above car
DBP—Down by pass non-preferred service
DC—Down hall call
DE—Door operator master pilot relay
DO—Door open signal DPU—Directional preference—up
DWP—Down preferred service call detection
DWPR—Down preferred service reversing
DWPRM—Down preferred service reversing interlock
HCD—Highest call down
HCU—Highest call up
IND—Independent service
KD—Down direction indicator
KU—Up direction indicator
LS—Hall call by-pass by loaded car or attendant "pass" signal
NPS—No more preferred service
PA—Motor and generator fields and brake potential
PB—In service at bottom terminal
PSD—By pass on preferred service
PSR—Preferred service reverse
SDA—Signal for down direction
SS—In service indication
SSMA—One car in service
SUA—Signal for up direction
TD—Door timer
UC—Up hall call
D—Floor down hall call
DT—Floor down hall call timer
DW—Floor down preferred service call
U—Floor up hall call
UW—Floor up preferred service call
D#—Down traveling car at (designated) floor
U#—Up traveling car at (designated) floor In general terms, the preferred service system of this invention provides for one or more cars to detect the presence of preferred service calls while the cars are traveling in the up direction. When a preferred service call is detected by the first car traveling in the up direction, the first car will no longer respond to up hall calls. It will stop at the next down hall call, automatically reverse its signal direction to down, and travel downward, by-passing normal down hall calls and stopping only in response to down preferred service calls. After the lowest preferred service call has been responded to, the car will return to normal service, responding to normal down hall calls below. In this specific embodiment of the invention, preferred service interlock means are provided to preclude any following car from being conditioned for immediate preferred service operation after the first car has been so conditioned. If desired, however, other cars can also be conditioned for immediate preferred service operation by a simple modification of the preferred service interlock means.

The car or cars following the first up-traveling car can also detect the presence of a preferred service call. However, these up-traveling cars will respond to up hall calls in a normal manner; they will travel up and respond to the highest call in the system, and then reverse and start in the down direction. Therefore, an up-traveling car which has detected a preferred service call will not necessarily travel to the top dispatching landing as would a car that has not detected a preferred service indication. After starting in the down direction, these cars will also be conditioned for preferred service, i.e. they will by-pass normal "down" hall calls and stop only in response to "down preferred service" calls until the lowest preferred service call has been responded to.

The preferred service system of this invention utilizes a variable time interval for timing the preferred service indication. As each down hall call is registered, it actuates a preferred service timer for the respective floor. At the expiration of a relatively short time interval, e.g. thirty seconds, the preferred service relay for that floor will be actuated. When the first preferred service relay is actuated, it reduces the effective voltage on all of the other timers to increase the timing interval for the next preferred service call to a longer interval, e.g. forty-five seconds. When the second preferred service relay is actuated, it causes a further increase in the timing interval for the following preferred service call. This variable timing provides quick response to calls during periods of light traffic without overloading the preferred service system during periods of heavy traffic.

Also, the preferred service system of this invention provides means for automatically reversing the highest up-traveling car at the mid-point of its upward travel when a preferred service relay is actuated. This provides for fast response in cases where the highest up-traveling car is above the preferred service floor when the preferred service relay is actuated.

FIGS. 1 through 12 show one exemplary group of circuits for executing the above described functions. FIG. 1 is a block diagram of a standard elevator control and dispatching system for operating the elevator under normal conditions. This control and dispatching system can be the same as the system disclosed in Patent No. 2,854,096, or it can be any other suitable system for controlling the normal functions of the elevator. It should be understood, however, that the invention is by no means restricted to dispatching type systems as described in Patent No. 2,854,096.

FIG. 2 shows a block diagram of standard up and down signal circuits and a schematic diagram of one exemplary circuit for reversing the direction of an up-traveling car that has been selected for down preferred service. In this circuit, the down direction relay SDA is energized via a contact network to reverse the direction of the elevator signals under the conditions noted in the general discussion above. The detailed operation of this reversal can be best described by an actual sequence of operation starting with a down hall call on the exemplary down hall call circuit shown in FIG. 6.

Figure 6:
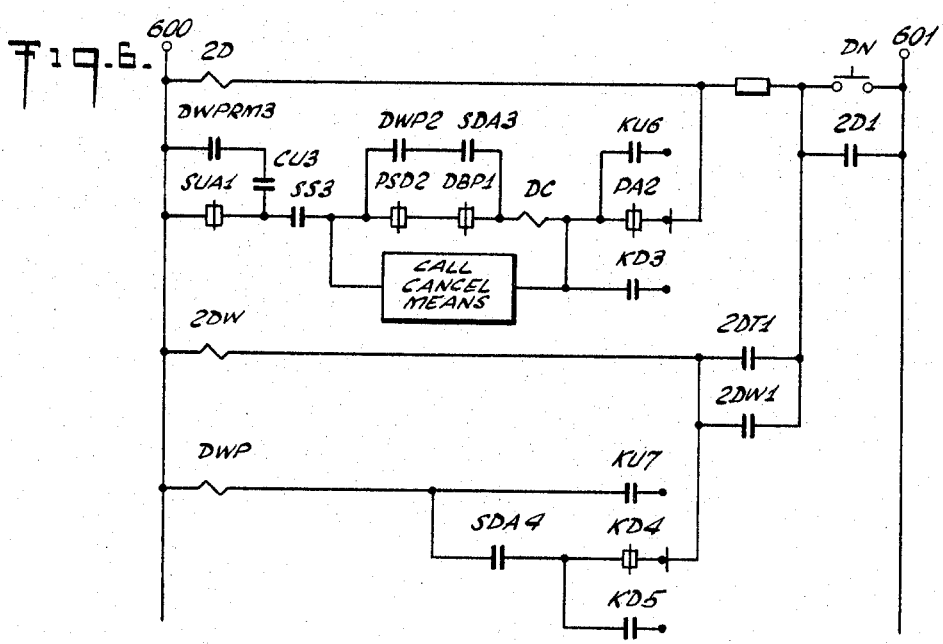
FIG. 6 is a schematic diagram of one exemplary down hall call circuit of this invention and one exemplary circuit for detecting down hall calls.

FIG. 6 shows the down hall call circuit for the second floor. It will be understood, of course, that each floor is equipped with a similar circuit. When the down button DN is pressed, the corresponding down relay 2D is energized and sealed closed by contacts 2D1. At the same time, a timing relay 2DT (FIG. 11) is activated by the closing of contacts 2D2. After the expiration of a predetermined time interval, e.g. thirty seconds, timing relay 2DT will become energized, thereby energizing preferred service relay 2DW in the hall call circuit (FIG. 6) via contacts 2DT1. Preferred service relay 2DW seals itself closed through contacts 2DW1 and 2D1. At the same time contacts 2DW2 (FIG. 11) short out timing relay 2DT, thereby increasing the voltage drop across resistors RDWPR and RDWPRA, and thus decreasing the voltage available to be applied to the other timing relays. This, of course, lengthens the time required for the other timing relays to close after being activated by down calls from their respective floors. In this particular example, the time interval is lengthened from thirty seconds to forty-five seconds, but any desired increase can be obtained by selecting the appropriate values for the resistors in the timing circuit, as will be explained in detail later.

Figure 12:
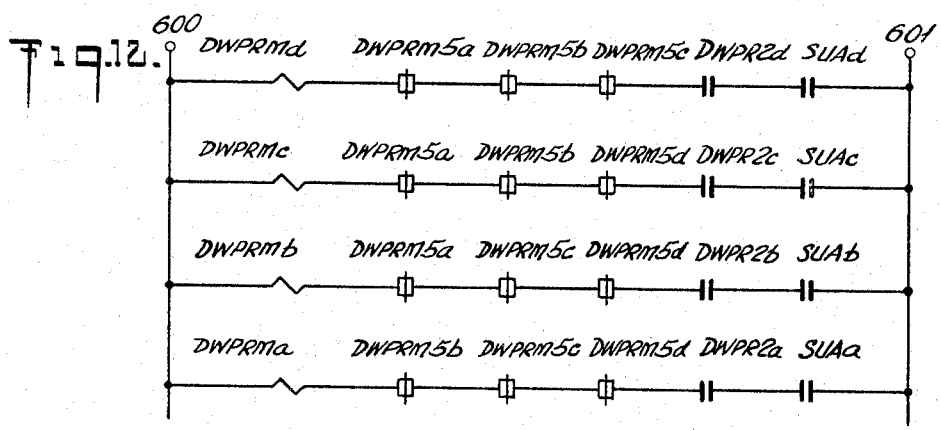
FIG. 12 is a schematic diagram of one exemplary preferred service interlock circuit.

After preferred service relay 2DW is energized, the presence of down preferred service call will be detected by the down preferred service call relay DWP of the next elevator car which passes the second floor. The DWP relay of the elevator car is energized via brushes DWP and contacts KU7 if the car is traveling in the upward direction. The KU contacts are closed whenever the elevator car is moving upwardly and the KD contacts are closed whenever the elevator car is moving downwardly. When the relay DWP is energized, it energizes the down preferred service reversing relay DWPR for the same elevator car via contacts DWP1 (FIG. 3). Relay DWPR seals itself closed via contacts DWPR1 and energizes a corresponding preferred service interlock relay DWPRM (FIG. 12) via contacts DWPR2. In the circuit of FIG. 12, the small letter designations a–d represent four different elevator cars. In this particular embodiment, the energization of one DWPRM relay opens the circuits of all of the other DWPRM relays.

Energization of a DWPRM relay is the signal to condition the corresponding elevator car for immediate down preferred service operation. The first step is to by-pass all up calls. This is accomplished by contacts DWPRM1 in the up call circuit shown in FIG. 5. The next step is to stop the elevator at the next down hall call and reverse its direction to down. This is accomplished through contacts DWPRM2 (FIG. 2) and DC1 (down hall call relay). After the elevator has started down, the next step is to by-pass normal down hall calls and stop only for preferred service down hall calls. This is done by relay PSD (FIG. 3), which is energized by contacts KD1 as soon as the elevator starts downward and is sealed closed by contacts PSD1. The actual by-passing action is initiated by contacts PSD2 (FIG. 6) which open the circuit to the "down" hall call relay DC except for preferred service calls, which are indicated by the closing of contacts DWP2. The return to normal service is effected by relay NPS, which is energized when all preferred service calls have been answered, as evidenced by de-energization of all of the preferred service call relays 2DW, 3DW . . . 9DW. When relay NPS is energized, it de-energizes relays DWPR and PSD (FIG. 3) via contacts NPS1, which in turn de-energizes relays DWPRM, thereby returning the elevator car to normal service again.

Figure 4:
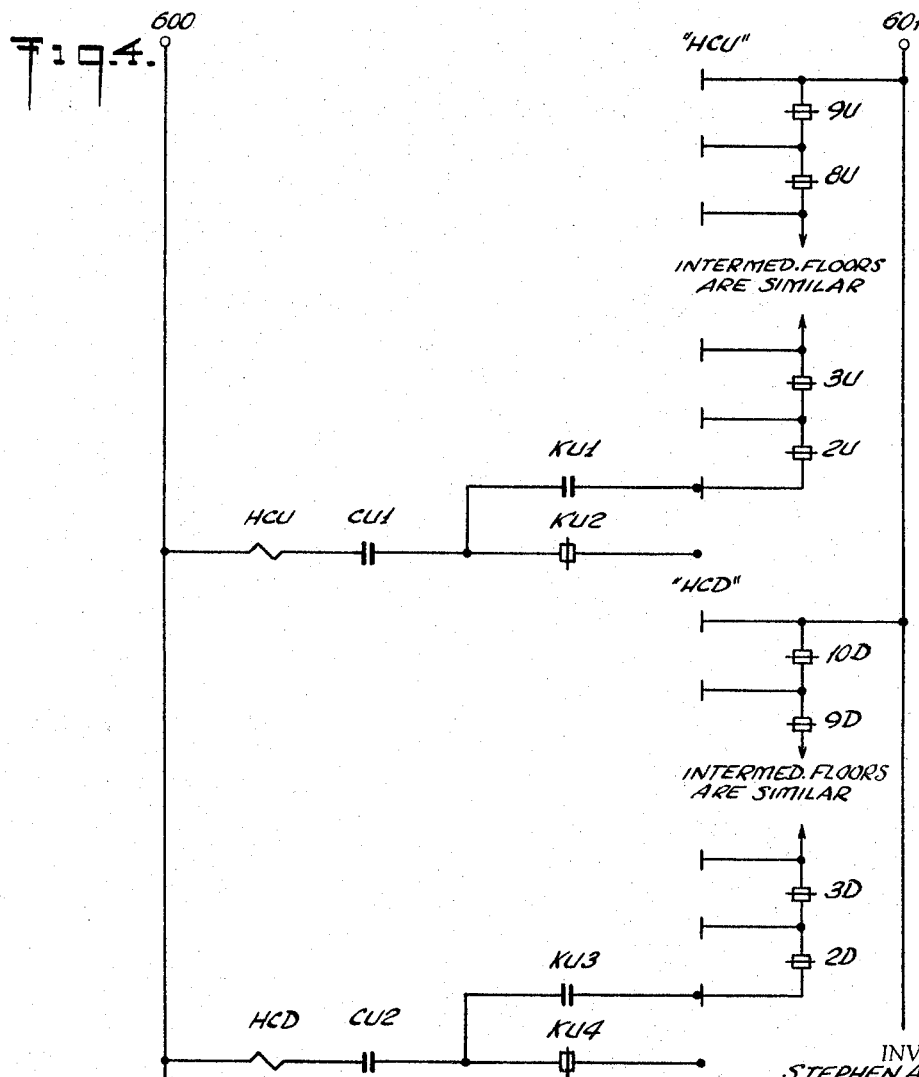
FIG. 4 is a schematic diagram of one exemplary circuit for determining when an elevator car has reached the highest up hall call and down hall call.
Figure 5:
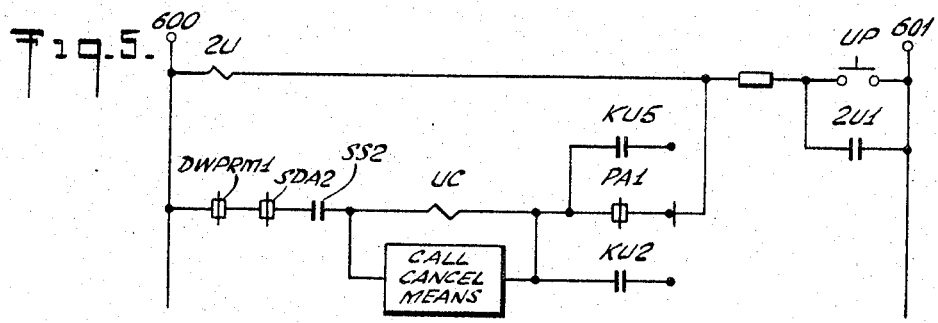
FIG. 5 is a schematic diagram of one exemplary up hall call circuit of this invention and one exemplary circuit for detecting up hall calls.
Figure 7:
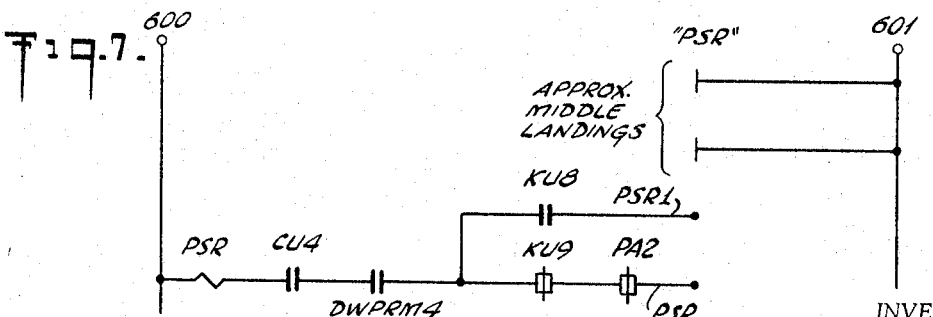
FIG. 7 is a schematic diagram of another exemplary circuit for reversing the direction of an up-traveling elevator car which has been selected for down preferred service operation.

If, after being conditioned for immediate preferred service operation, the elevator car does not come to a down hall call until it reaches the highest down hall call, it will be reversed by contacts HDC1 (FIG. 2), which operate when the elevator is at the highest floor having a down hall call (FIG. 4). If the elevator car reaches the midpoint of its upward travel before it reaches a down hall call, it will be reversed by contacts PSR1 (FIG. 2), which close when the elevator car makes contact with PSR brushes installed near the middle landings (FIG. 7).

If an upward traveling car passes a preferred service floor after the first car passes but before the preferred service call has been answered, the DWPR relay of the second car will be energized but its DWPRM relay will not because of the interlocking action of the circuit in FIG. 12. The second car will therefore continue to travel upward and answer normal up hall calls until it reaches the highest call in the system. At this time the second car will be reversed by energizing its SDA relay through contacts DWPR3, HCU1 and HCD2 (FIG. 2). It will then be conditioned to respond to preferred service calls by the same process as described above for the first car.

It should be noted, however, that an up-traveling car will not be conditioned for preferred service if the up directional preference relay DPU is activated or if there is a car call above the car as evidenced by the deactivation of relay CU. In the first case, the circuit for the DWPR relay will be opened by contacts DPU1 (FIG. 3) and the circuit for the SDA relay will be opened by contacts DPU2 (FIG. 2). In the second case, the circuit to the DC relay will be opened by contacts CU3 (FIG. 6), the circuit to the PSR relay will be opened by contacts CU4 (FIG. 7), and the circuit to the HCU and HCD relays will be opened by contacts CU1 and CU2 (FIG. 4). Furthermore, an up-traveling car will not be conditioned for preferred service if it has been selected for independent service, as evidenced by the opening of contacts IND1 (FIG. 2), or if the attendant has selected the up direction as evidenced by the opening of contacts AU1 (FIG. 3).

In addition to the above described down preferred service circuits, the system of this invention also inludes an up preferred service circuit for the first floor. This circuit, which is shown in FIGS. 9 and 10, selects the lowest downward traveling car and causes it to by-pass normal down calls by energizing relay DBP, which opens the circuit to relay DC via contacts DBP1 (FIG. 6). Relay DBP is energized by the closing of contacts IUW1, which signify an up preferred service call from the first floor. The relay DBP of the lowermost car is selected by virtue of the normal closed contact D2, D3 . . . D9 which open when a down-traveling car is at the corresponding floor (FIG. 10) and thus open the DBP relay circuit of all higher down-traveling cars. It should be noted, however, that a car which is conditioned for down preferred service will not be selected for up preferred service due to contacts DWPR4. In addition, contacts DWPRM5, FIG. 10, removes down preferred service car influence from position and direction control and permit dispatch of subsequent car if necessary.

Figure 11:
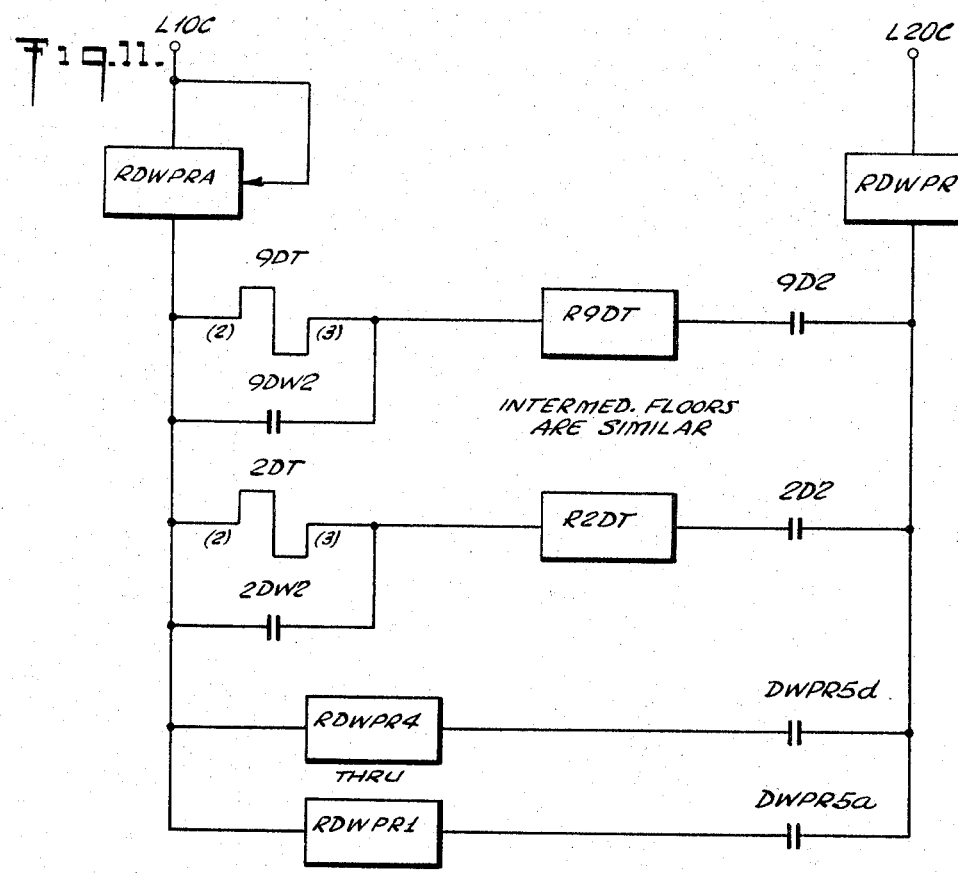
FIG. 11 is a schematic diagram of one exemplary circuit for varying the time interval of the preferred service timers in accordance with traffic conditions.

In the variable timing circuit shown in FIG. 11, it was previously explained how the time increment for each successive relay was increased by means of shorting out the coil of each timing relay DT when its corresponding preferred service relay DW was activated. This action is further enhanced by contacts DWPR5–a through DWPR5–d, which close when their respective elevator cars detect a preferred service indication, thus further reducing the voltage applied to the timers, and further lengthening the time interval required for preferred service in heavy traffic. The exact time interval variation will be determined by the voltage-time characteristic of the specific timer relays used in the circuit and the specific resistor values selected. In general terms, the lengthening effect will be increased as the value of resistors RDWPRA and RDWPR are increased. It will also be increased as the value of resistors R2DT . . . R9DT and RDWPR1 . . . RDWPR4 are decreased, as will be apparent to those skilled in the art.

From the foregoing description it will be apparent that this invention provides a novel preferred service elevator control system which is responsive to actual traffic density and which responds to preferred service calls in a very short time. It will also be apparent that this invention provides a preferred service system which is simpler and more reliable than those heretofore known in the art. And it should be understood that this invention is by no means limited to the specific embodiments disclosed herein, since many modifications can be made in the disclosed structure without departing from the basic teaching of this invention. For example, it is not necessary to use the invention in combination with a dispatching type system such as disclosed herein. The invention can be used in combination with any suitable elevator control system that is compatible with the functions performed by the invention. Furthermore, it is not necessary to use the specific relays and contact circuits disclosed herein. Any suitable circuits which preform the desired functions can be used to embody the invention. In addition, it is not necessary to limit the number of cars which are conditioned for immediate preferred service to one. Any number can be so conditioned by a simple alteration in the preferred service interlock circuit. Also, it is not necessary to include the up preferred service circuit in the system. If desired, the system can be limited to down preferred service. These and many other modifications of the disclosed structure will be apparent to those skilled in the art, and this invention includes all modifications falling within the scope of the following claims:

What is claimed is:

1. In an elevator control system for a plurality of elevator cars operable between a plurality of floors, a preferred service system comprising means for initiating service calls from a plurality of different floors, variable timing means responsive to the number of unanswered service calls initiated by said call initiating means and operable to generate a preferred service indication for service calls which remain unanswered after a time which is directly proportional to the number of unanswered service calls, said elevator cars to by-pass ordinary service calls and answer only preferred service calls.

2. In an elevator control system for a plurality of elevator cars operable between a plurality of floors, a preferred service system comprising means for initiating service calls from a plurality of different floors, variable timing means responsive to said service calls and operable to generate a preferred service indication for service calls which remain unanswered after a time interval directly proportional to the number of unanswered calls, and means for selecting and conditioning one of said elevator cars to by-pass ordinary service calls and answer only preferred service calls, wherein said variable timing means includes means for lengthening said time interval in response to the generation of each additional preferred down service indication, and means to shorten said time interval in response to the termination of each preferred service indication.

3. In an elevator control system for a plurality of elevator cars operable between a plurality of floors, a preferred service system comprising hall call means for initiating service calls from a plurality of different floors, timing means responsive to said service calls and operable to initiate a preferred service indication for service calls which remain unanswered after a predetermined variable time interval wherein said timing means includes means for lengthening the time interval required for successive calls to become preferred in response to an increase in the total number of unanswered preferred service indication, and for shortening said time interval in response to a decrease in the total number of preferred service indication, means to terminate said preferred service indication when the corresponding service call is answered, and control means for selecting and conditioning one of said elevator cars to by-pass ordinary service calls and answer only preferred service calls.

4. The combination defined in claim 3 wherein said variable timing means includes means for lengthening said time interval in response to the initiation of a preferred service indication and shortening said time interval in response to the termination of a preferred service indication.

5. The combination defined in claim 4 wherein said hall call means is operable to initiate "up" calls and "down" calls, and wherein said variable timing means is operable to initiate a preferred service indication in response to a "down" call which remains unanswered after a predetermined time interval, and wherein said control means is operable to select and condition an upwardly traveling elevator car to reverse its direction of travel and answer only "down" preferred service calls.

6. The combination defined in claim 5 wherein said control means is operable to reverse the direction of the first upwardly traveling elevator car which passes the floor having the preferred service indication.

7. The combination defined in claim 6 and also including interlock means operable to limit the number of elevator cars which are selected and conditioned to reverse direction in response to preferred service indications.

8. The combination defined in claim 7 in which said first upwardly traveling car is conditioned to reverse direction at the first "down" service call above the floor having the preferred service indication.

9. The combination defined in claim 8 and also including means for automatically reversing the direction of said upwardly traveling car near the midpoint of its upward travel after a preferred service indication has been detected below said midpoint.

10. The combination defined in claim 9 and also including means for conditioning upwardly traveling cars which follow said first upwardly traveling car to respond only to preferred service calls after they have answered the highest service call in the system.

11. The device of claim 1 wherein said variable timing means is responsive to the number of unanswered down service calls initiated by said call initiating means.

References Cited

UNITED STATES PATENTS

| | | | |
|---|---|---|---|
| 2,347,054 | 4/1944 | Hunt | 187—29 |
| 2,624,425 | 1/1953 | Eames | 187—29 |
| 2,688,384 | 9/1954 | Yeasting | 187—29 |
| 2,771,160 | 11/1956 | Borden et al. | 187—29 |
| 2,795,295 | 6/1957 | Eames | 187—29 |
| 3,051,268 | 8/1962 | Dinning | 187—29 |
| 3,065,825 | 11/1962 | Yeasting | 187—29 |
| 3,187,843 | 6/1965 | Magee | 187—29 |

ORIS L. RADER, *Primary Examiner.*

BENJAMIN DOBECK, *Examiner.*

T. LYNCH, *Assistant Examiner.*